United States Patent
Moore et al.

(10) Patent No.: US 10,036,108 B2
(45) Date of Patent: Jul. 31, 2018

(54) APPARATUS AND METHOD FOR APPLICATIONS OF OPTICAL FIBER COATINGS

(71) Applicant: Corning Incorporated, Corning, NY (US)

(72) Inventors: Robert Clark Moore, Wilmington, NC (US); Douglas Gregg Neilson, Wilmington, NC (US)

(73) Assignee: Corning Incorporated, Corning, NY (US)

(*) Notice: Subject to any disclaimer, the term of this patent is extended or adjusted under 35 U.S.C. 154(b) by 568 days.

(21) Appl. No.: 14/521,900

(22) Filed: Oct. 23, 2014

(65) Prior Publication Data
US 2015/0147467 A1    May 28, 2015

Related U.S. Application Data

(60) Provisional application No. 61/908,863, filed on Nov. 26, 2013.

(51) Int. Cl.
| | |
|---|---|
| *D06B 3/06* | (2006.01) |
| *G02B 6/036* | (2006.01) |
| *B05C 11/02* | (2006.01) |
| *C03C 25/18* | (2006.01) |
| *G02B 6/44* | (2006.01) |
| *C03C 25/104* | (2018.01) |

(52) U.S. Cl.
CPC .............. *D06B 3/06* (2013.01); *B05C 11/021* (2013.01); *C03C 25/104* (2013.01); *C03C 25/18* (2013.01); *G02B 6/036* (2013.01); *G02B 6/4402* (2013.01)

(58) Field of Classification Search
None
See application file for complete search history.

(56) References Cited

U.S. PATENT DOCUMENTS

| | | | | |
|---|---|---|---|---|
| 5,127,361 | A * | 7/1992 | Matsuda | C03C 25/18 118/405 |
| 5,976,253 | A * | 11/1999 | Rosenkranz | G02B 6/4482 118/119 |
| 6,030,658 | A * | 2/2000 | Tsuchiya | C03C 25/12 118/405 |
| 2003/0136340 | A1 | 7/2003 | Fujimaki et al. | |
| 2007/0227194 | A1 | 10/2007 | Song et al. | |
| 2007/0259107 | A1* | 11/2007 | Miyasaka | B29D 11/00663 427/163.2 |

FOREIGN PATENT DOCUMENTS

EP    0476491    3/1992

OTHER PUBLICATIONS

Written Opinion for PCTUS2014065664 corresponding to instant claims.*

* cited by examiner

*Primary Examiner* — Charles Capozzi
(74) *Attorney, Agent, or Firm* — Svetlana Z. Short (57) ABSTRACT

One embodiment of the disclosure relates to a fiber coating apparatus having a fiber entrance opening, a conical section with walls tapered at half angles between 2 and 25° and height (also referred to as length herein) $L_1$ between 0.25 mm and 2 mm, and a cylindrical land portion of diameter $d_2$ between 0.1 and 0.5 mm and height (length) $L_2$ between 0.05 and 1.25 mm.

16 Claims, 10 Drawing Sheets

FIG. 10
Cone-only 11 mil single-layer

FIG. 11

FIG. 12

APPARATUS AND METHOD FOR APPLICATIONS OF OPTICAL FIBER COATINGS

CROSS-REFERENCE TO RELATED APPLICATIONS

This application claims the benefit of priority under 35 U.S.C. § 119 of U.S. Provisional Application Ser. No. 61/908,863 filed on Nov. 26, 2013 the contents of which are relied upon and incorporated herein by reference in their entirety.

BACKGROUND

The disclosure relates generally to an apparatus and method for coating optical fibers and more particularly to coating dies which may be used to coat optical fiber during draw.

A coating material commonly used in the manufacture of optical fibers is an acrylate-based composition which is curable by exposure to ultraviolet (UV) light. This material is applied to the surface of the fiber in a liquid state and is subsequently exposed to heat or UV light for curing. The coating material may be applied in one or more layers, with a two-layer coating system often being a preferred embodiment. The primary coating is applied directly to the surface of the fiber, and the secondary coating is applied over the primary coating.

Higher draw rates reduce the cost of manufacturing optical fiber. When coating an optical fiber, it is important to produce, at high draw rates, coatings which have uniform diameter and which are concentric with the fiber. Both of these attributes contribute to ease in splicing and connectorization of the fiber, thereby providing for lower losses in an installed fiber application. Market demands continue to place increasingly stringent tolerances on the diameter and concentricity of optical fiber coatings No admission is made that any reference cited herein constitutes prior art. Applicant expressly reserves the right to challenge the accuracy and pertinence of any cited documents.

SUMMARY

One embodiment of the disclosure relates to a fiber coating apparatus having a fiber entrance opening, a conical section with walls tapered at half angles between 2 and 25° and height (also referred to as length herein) $L_1$ between 0.25 mm and 2 mm, and a cylindrical land portion with an inner diameter $d_2$ such that 0.1 mm$\leq d_2 \leq$0.5 mm and height (length) $L_2$ between 0.05 mm and 1.25 mm. In some embodiments 0.5 mm$\leq L_1 \leq$1.75 mm, and in some embodiments height $L_2$ is $0.5d_2 \leq L_2 \leq 2.5d_2$.

An additional embodiment of the disclosure relates to a fiber coating apparatus comprising:
a sizing die having a body comprising
(a) fiber entrance opening;
(b) a first portion, situated directly adjacent to said fiber entrance opening and having a conical ferrule with tapered wall, the conical ferrule having a cross-section with inner walls angled at a half angle α and height $L_1$, where 2°≤α≤25°, $L_1$ is between 0.25 mm and 2 mm; and
(c) a cylindrical land portion having a substantially constant inner diameter $d_2$ and height $L_2$, and 0.1 mm$\leq d_2 \leq$0.5 mm.

In some embodiments, 0.125 mm$\leq d_2 \leq$0.5 mm and $0.5d_2 \leq L_2 \leq 2.5d_2$. In some embodiments 5°≤α≤25°, and 0.5 mm$\leq L_1 \leq$1.75 mm. In some embodiments 8°≤α≤25°.

An additional embodiment of the disclosure relates to a fiber coating apparatus comprising:
(I) a guide die; and
(II) a first sizing die situated adjacent to the guide die, the coating die including
  (a) fiber entrance opening;
  (b) a first portion, situated below the fiber entrance opening, the first portion forming a conical ferrule with tapered wall, wherein the conical ferrule has a cross-section with inner walls angled at a half angle α and height $L_1$, where 2°≤$α_1$≤25° and $L_1$ is between 0.25 mm and 2 mm;
  (c) a cylindrical land portion situated adjacent to the first portion having a substantially constant inner diameter $d_2$ and length $L_2$, such that 0.1 mm$\leq d_2 \leq$0.5 mm and $0.5d_2 \leq L_2 \leq 2.5d_2$; and
  (d) a cylindrical leg portion having an inner diameter greater than $d_2$, the cylindrical leg portion being situated either above the first portion or below the cylindrical land portion; and
(III) a second sizing die situated adjacent to said first sizing die.

An additional embodiment of the disclosure relates to a method for coating an optical fiber, comprising:
(I) coating the optical fiber with a primary coating material by moving the optical fiber through the first sizing die of the coating apparatus, the first sizing die including:
  (a) fiber entrance opening; (b) a first portion, situated below the fiber entrance opening, the first portion forming a conical ferrule with tapered wall, wherein the conical ferrule has a cross-section with inner walls angled at a half angle α and height $L_1$, where 2°≤$α_1$≤25° and $L_1$ is between 0.25 mm and 2 mm; (c) a cylindrical land portion situated adjacent to the first portion having a substantially constant inner diameter $d_2$ and length $L_2$, such that 0.1 mm$\leq d_2 \leq$0.5 mm and $0.5d_2 \leq L_2 \leq 2.5_2$; and (d) a cylindrical leg portion having an inner diameter greater than $d_2$, the cylindrical leg portion being situated either above the first portion or below the cylindrical land portion, and
(II) applying a secondary coating by moving the optical fiber with the primary coating thereon through the second sizing die of the coating apparatus, the second sizing die including: (a) fiber entrance opening; (b) a first portion, situated below the fiber entrance opening, the first portion forming a conical ferrule with tapered wall, wherein the conical ferrule has a cross-section with inner walls angled at a half angle α and height $L_1$, where 2°≤$α_2$≤25° and $L_1$ is between 0.25 mm and 2 mm; (c) a cylindrical land portion situated adjacent to the first portion having a substantially constant inner diameter $d_2$ and length $L_2$, such that 0.1 mm$\leq d_2 \leq$0.5 mm and $0.5d_2 \leq L_2 \leq 2.5_2$; and (d) a cylindrical leg portion having an inner diameter greater than $d_2$, the cylindrical leg portion being situated either above the first portion or below the cylindrical land portion.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
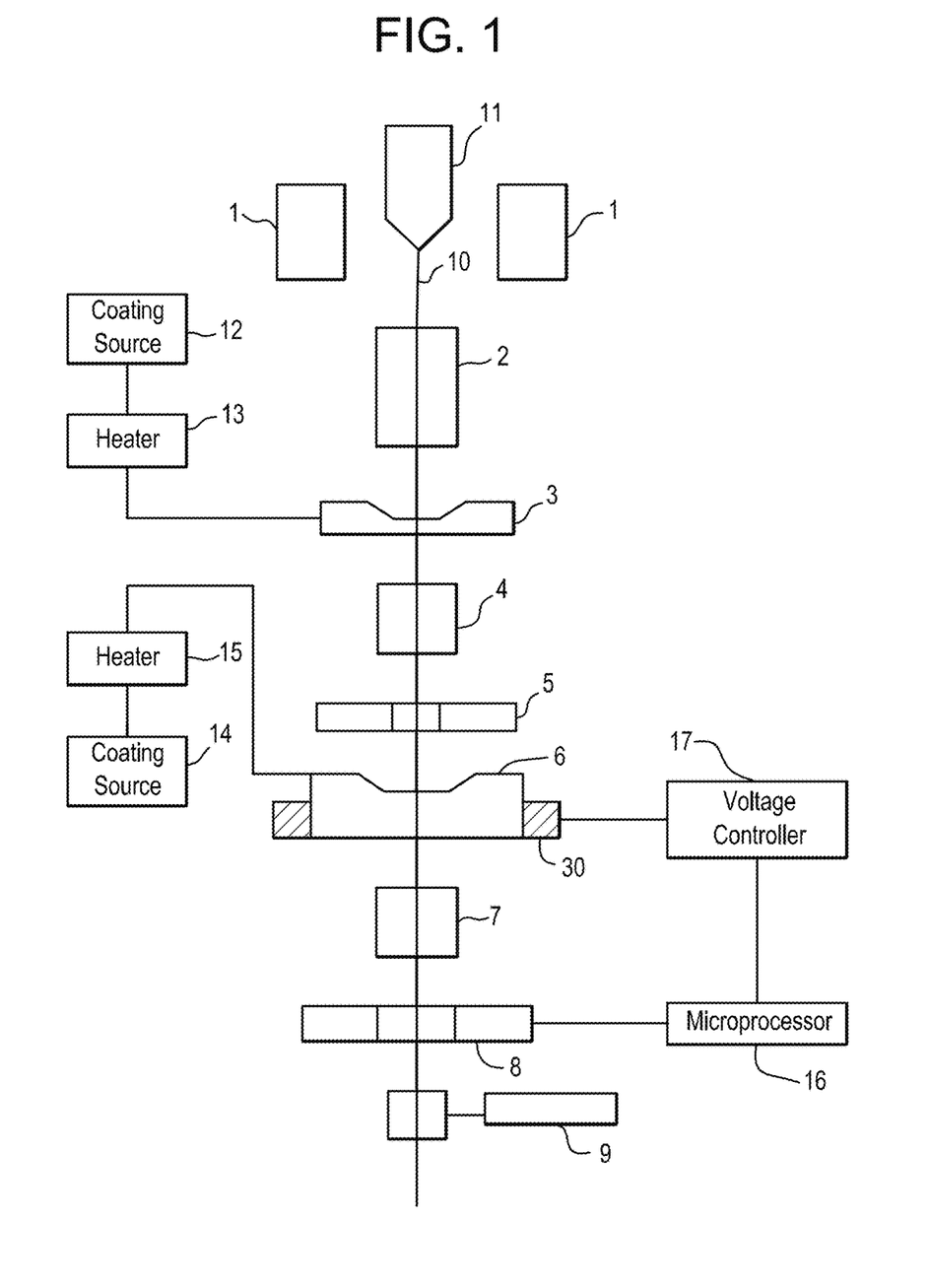
FIG. 1 is a schematic view of a fiber drawing and coating system, used in the production of optical fibers.

A fiber drawing and coating system, used in the production of optical fibers, is shown in FIG. 1. Fiber 10 is drawn from preform 11 which is heated in furnace 1. Fiber 21 passes through fiber cooling device 2 and then through primary coater 3 where it is coated with a layer of primary coating material. The primary coating layer is cured in primary coating curing device 4, and the diameter of the fiber including the cured primary coating is measured by device 5. Curing device 4 typically comprises an irradiator array. Fiber 21 passes through secondary coater 6 where it is coated with a layer of secondary coating material that is cured in curing device 7 which is similar to curing device 4. The diameter of the fiber including the cured secondary coating is measured, for example by device 8. Tractor means 9 pulls the fiber from furnace 1 and through the intermediate devices. The drawn fiber is typically taken up onto spools by a winder (not shown) for further processing. Coating material is supplied to coaters 3 and 6 from sources 12 and 14, respectively. The inlet or delivery temperature of the coating material can be maintained at a desired value by devices 13 and 15, respectively, which are in communication with the coating delivery line.

Alternatively, the fiber passes through the primary coater 3 and then through the secondary coater 6, without passing through a primary coating curing device 4 in between the two coaters. The second coating is applied directly on the primary coating before both coatings are cured. This is known as wet-on-wet" or "WOW" application process.

Comparative Example

Figure 2:
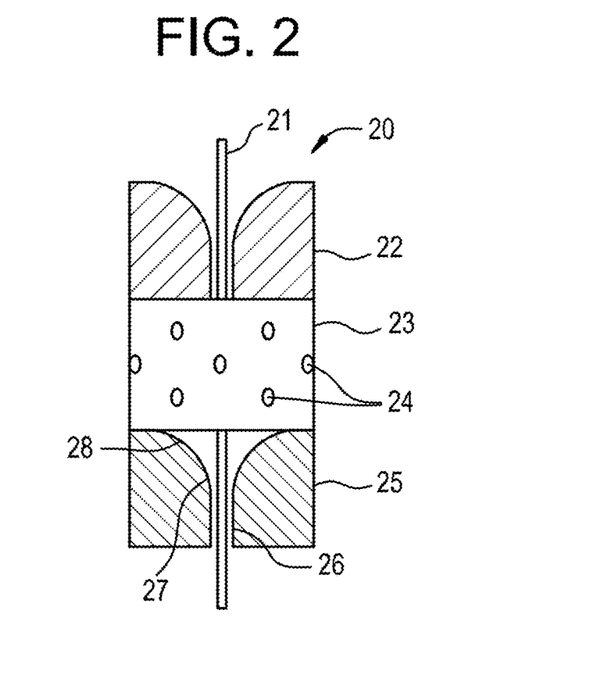
FIG. 2 is a schematic view of typical coating die assembly used in the process of coating optical fibers.

FIG. 2 shows a conventional coating die assembly currently used in the process of coating optical fibers as coaters 3 and 6 in fiber drawing and coating system of FIG. 1. This figure shows a cross-sectional views of a guide die, sleeve, and the sizing die of a conventional coating assembly. Fiber 21 enters coating die assembly 20 through guide die 22. Coating material is delivered to coating die assembly 20 through holes 24 in sleeve 23. The coating material is typically supplied to die assembly 20 under pressure and at a constant temperature radially toward the fiber 21. (As used herein the average temperature of the coating material as it enters the sleeve 23 is referred to as delivery temperature of the coating material.) A pressurized coater insures that the level of coating material inside die assembly 20 is maintained throughout the fiber coating process. Fiber 21 exits coating die assembly 20 through the exit aperture (diameter $d_2$) of the bore of the sizing die 25. As fiber 21 passes through coating die assembly 20, the coating material adjacent to the fiber is acted upon by shear stresses and is entrained by (accelerated with) in the same direction as the fiber motion. As the coating material and fiber 21 enter sizing die 25, a portion of the coating material is pulled out with the fiber. The coating material that is accelerated by the fiber, but not pulled out with the fiber, turns from the nominal direction of fiber motion and recirculates to form gyre G within coating die assembly 20.

The sizing die 25 (also referred to as the coating die herein) configuration determines the amount of coating that is applied to the fiber 21. The sizing die 25 also performs the function of centering the fiber so that the coating is concentric with the fiber. The commercial sizing die 25 typically has convex walls 28 forming the upper region of the fiber passage through the sizing die (also referred to as the die bell region, or bell portion 28' herein), a taper shaped middle portion (taper region 27) of the passage formed by the essentially conical walls, and a cylindrical land portion 26 of the passage of the sizing die 25 (see FIG. 3, for example). The die's cylindrical land region 26 is defined as the region at or near the exit of sizing die 25 where the diameter of inner wall of sizing die 25 is substantially constant (i.e., it does not change by more than 1%, and preferably by less than 0.2%) with distance from the exit of sizing die 25.

Figure 3:
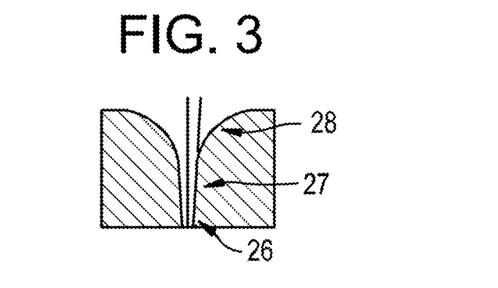
FIG. 3 is a schematic cross-sectional view of the sizing die assembly used in the coating die assembly of FIG. 2.

The amount of coating material which is drawn out with fiber 10 is dependent on the velocity profile of the coating material within the sizing die 25. This velocity profile of the coating material is most affected by the speed at which fiber 21 is drawn through coating die assembly 20, the geometry of sizing die 25 and the viscosity profile of the coating material in sizing die 25. The viscosity profile of the coating material is a function of its temperature. When the region in which the viscosity profile is controlled by controlling the temperature of the coating material, one can achieve a very responsive control of coated fiber diameter.

The fluid pressure of the coating within the sleeve 23 should be sufficiently high that the coating material forms a meniscus in the vicinity of the exit orifice of the guide die 22, at a low position along the guide die's cylindrical land region. The guide die 22 functions as a cap to the pressurized coating assembly and prevents the coating material from flowing out of the top of the coating assembly. When the guide die 22 fails to perform this function due to under-or over-pressurization within the coating assembly, a so-called "coating flood" occurs, and the draw process must be interrupted.

During operation, the fiber 21 entrains (pulls along) a boundary layer of coating material, most of which is rejected in the convex upper region (bell portion) 28' and the taper region 27 of the sizing die 25. The rejection causes pressures of as much as 800 psi to build up at the apex of the cone in the taper region 27 of the sizing die 25. This pressure forces additional coating through the cylindrical land region 26 of the of the sizing die 25. This pressure also creates a force that helps center the fiber 21 in the sizing die 25.

Figure 4:
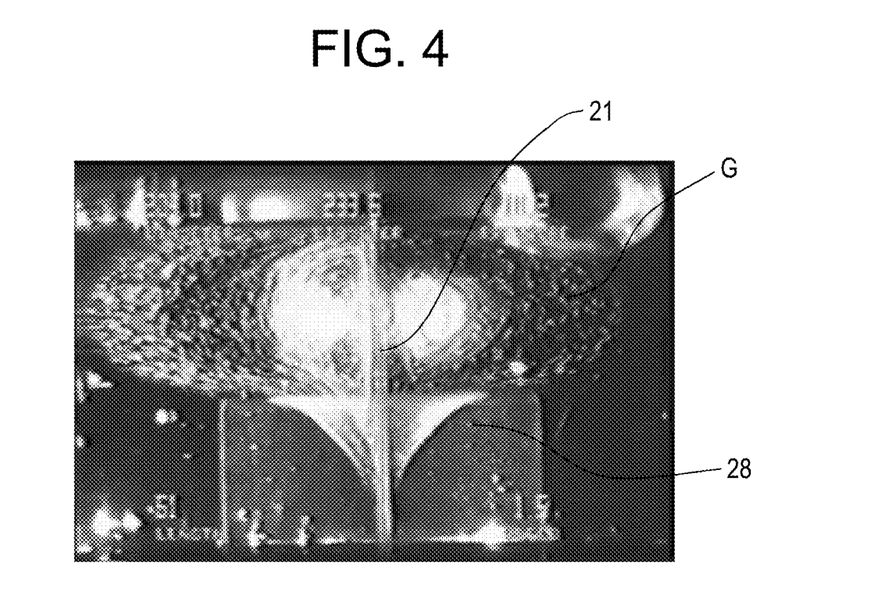
FIG. 4 is an illustration of the coating material vortex situated above the sizing die of FIG. 3.

As shown in FIG. 4, during the coating process, when a commercial sizing die 25 is used, the rejected coating material forms a torus-shaped circulating cell of coating material, known as a coating vortex or gyre G. The gyre G is formed in the area above the cylindrical land region 26 (and more specifically in the area adjacent the entrance aperture of the sizing die 25—i.e., in the area adjacent to the convex walls 28), and the gyre G is not stable. The recirculation region (vortex) of the gyre G extends through the bell portion of the sizing die 25 down into the taper region 27 of the die. Our experiments showed that the gyre G is not, in general, uniform azimuthally, and that bubble tracers (introduced for analysis purposes) reveal that the gyre G can precess, i.e. it can experience change in the orientation of the rotational axis) about the fiber 21. That is, the rotational motion of the gyre/vertex is not axisymmetric. The effect of the gyre's movement is to create a non-axisymmetric and quasi-random force on the fiber, which manifests as increased eccentricity in the fiber coating(s)—i.e., the fiber coating not being centered on the fiber axis.

The coating material's temperature in the vortex is elevated compared to the delivery temperature of the coating material to the sleeve 23, because of shear heating resulting from the very high shear rates in the vortex/gyre G. Finite-element computer models indicate that the coating temperature in the middle of the toroidal-shape vortex/gyre G increases rapidly as the fiber draw speed increases, and may be as much as 80° C. higher than the coating material delivery temperature. The temperature increase for the coating material inside the vortex/gyre G as compared to the delivery temperature is even greater for smaller sizing dies, for example dies with a bore diameter $d_2 \leq 0.15$ mm, because more coating material is rejected relative to a die with a larger bore diameter $d_2$, and is also greater for faster fiber draw speeds, because the gyre G spins faster. That is, as the bore diameter $d_2$ decreases, the amount of coating that is rejected in the taper section of the die increases. That, in turn, increases the size of the vortex and the temperature increase in the middle of the gyre G. Because the vortex/gyre G is not stable, some of this hot coating material can escape via an eddy current or other perturbation, and when the hot coating enters the taper shaped portion (i.e., the middle portion 27) of the standard sizing die 25, the centering forces acting on the fiber 21 are no longer axisymmetric. The unbalanced forces again result in poor fiber-coating offset. As used herein, the offset is measured as the distance, typically in μm, between the center of the applied coating and the center of the fiber that is being coated. Perhaps even more critically, the hot coating material can migrate to the guide die 22 and then form the upper meniscus shape in the guide die 22. The lower viscosity of the hot coating material (due to higher temperature and the shear thinning) makes the coating process more susceptible to flooding, that is, to dewetting of the fiber and the consequent flowing of coating material past the fiber 21 upward through the gas space above and within the guide die 22 and out. When flooding occurs, the fiber 21 typically breaks. Breaks require that the draw process be restarted, which can contribute significantly to the manufacturing cost.

Shear thinning is a phenomenon commonly seen with non-Newtonian fluids, such as polymers. As the fluid is subjected to larger shear rates, the molecules in the fluid align themselves such that the fluid's viscosity drops below its value at zero shear.

Viscous heating is a phenomenon seen with both Newtonian fluids and non-Newtonian fluids. As fluid is subjected to larger shear rates, friction between the fluid molecules generates heat. This generation of heat locally increases the temperature of the fluid. In the case of optical waveguide fibers, shear stresses develop due to the speed of the fiber through the coating material. These shear stresses generate heat and raise the temperature of the coating material. An increase in the coating material's temperature decreases its viscosity. A significant amount of viscous heating occurs in the sizing die's cylindrical land region 26; this viscous heating can cause local coating material temperatures to become greater than the delivery temperature of the coating material. The increase in temperature significantly decreases coating viscosity in the cylindrical region 26 of the sizing die 25.

Figure 5:
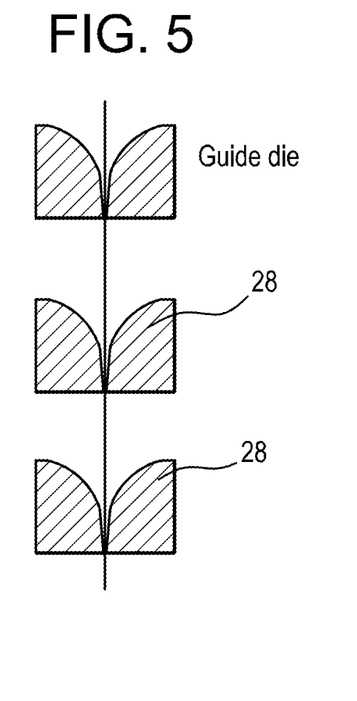
FIG. 5 is a schematic cross-sectional view typical of a wet-on-wet dual coating applicator.

Furthermore, when the two sizing dies of the above discussed configuration are stacked as shown in FIG. 5, to apply two coatings sequentially without curing in between (otherwise known as wet-on-wet) application, we observed that it results in the poor coating offset. That is, the offset of both coatings (e.g., the primary and the secondary coatings) is compromised when the die configuration of FIG. 5 is utilized to create the two fiber coatings. The centering forces from the two sizing dies 25 do not, in general, act in the same direction, and these forces furthermore become random due to the precession of the gyres present inside the two sizing dies 25. Thus, the forces on the fiber are both chaotic (i.e., the motion is random) and independent. These are forces that are created due to pressure and shear variations around the circumference of the fiber.

We determined that the convex shape of the upper portion of the typical sizing die (i.e., the convex shape of wall 28) is a primary mechanism for creating the strong coating material vortex/gyre G. We also discovered that the height of the taper region 27 also affects the size and/or strength of the vortex/gyre G. In some embodiments we minimized (reduced) the size and strength of the coating gyre compared to that produced by the die designs shown in FIGS. 2, 3 and 5 by minimizing/reducing the size of the sizing die's convex walls 28, so the high $L_0$ of the convex walls 28 is $\leq 0.5$ mm. In some embodiments we minimized (reduced) the size and strength of the coating gyre compared to that produced by the die designs shown in FIGS. 2, 3 and 5 by entirely eliminating the convex walls 28 in the coating/sizing die 25 and by reducing the height (also referred to as length herein) of the tapered cone (taper region 27 of the die formed by the walls 27A of the die 25) to 2 mm or less. The effect was a large reduction in the size of the entrained coating boundary layer, which reduces the amount of coating rejected in the cone (taper region 27), in turn reducing the strength of the coating material gyre G. (The boundary layer is the region of the coating material adjacent to the moving fiber where a velocity gradient as large as $10^6$ sec$^{-1}$ may exist for draw speeds typical of a modern fiber draw tower.)

As fiber draw speeds increase or the diameter of the sizing die decreases, more coating is rejected in the sizing die taper region 27, and the gyre G in the upper portion or bell portion 28' of the commercial sizing dies (i.e., the gyre in the region adjacent to the convex walls 28) gets stronger. This leads to both increased instability of the fiber position, which causes an increase in coating offset, and to increased incidence of flooding, which causes fiber breaks, increasing costs. We discovered that: 1) reducing the height (length) $L_1$ of the taper in the middle region 27; and 2) eliminating or substantially reducing the size of the die bell region 28' greatly reduces the amount of coating rejected by the die and consequently reduces the size of the gyre G. The result is that the offset of the coating(s) is improved, and the propensity for flooding is reduced.

We discovered that the geometry of coatings applied via the wet-on-wet process is significantly improved when sizing dies 25 with the reduced bell region height ($L_0$<0.5 mm), and reduced taper region high ($L_1$<2.2 mm and even more preferably $L_1$≤2 mm) are utilized. It is preferable that the sizing die(s) 25 do not have the bell region 28' (i.e. $L_0$=0 mm) and that the sizing die(s) 25 have taper region 27 with a small height (such that $L_1$<2.2 mm and preferably $L_1$<2 mm). Because the gyres G in each sizing die 25 are independent and move in a random fashion, the offsets of both coatings can be adversely affected by using commercially available sizing dies such as those shown in FIGS. 2, 3 and 5. Reduction in the size of the bell portion 28' (or its elimination) and/or reduction in the size of the taper portion 27, reduces the size and the strength of the gyro G, thus allowing the centering forces to improve/minimize the coating offset. Preferably, to achieve good coating concentricity, 0.25<$L_1$<2 mm, more preferrably 0.5<$L_1$<1.8 mm, and in some embodiments 0.7<$L_1$<1.5 mm.

Various embodiments will be further clarified by the following examples.

Example 1

Figure 6A:
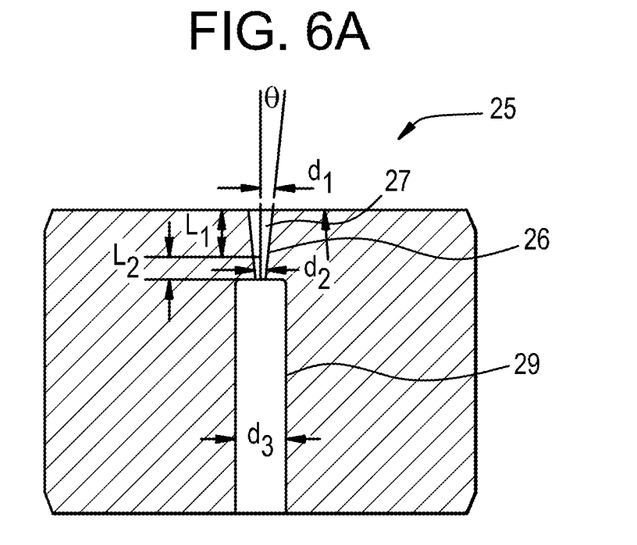
FIG. 6A is a schematic cross-sectional view of one embodiment of the sizing die.
Figure 6B:
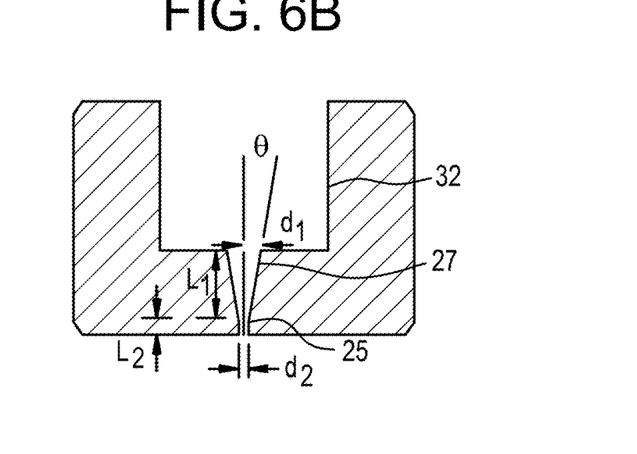
FIG. 6B is a schematic cross-sectional view of the another embodiment of the sizing die.

Two embodiments of the improved sizing die 25 ("cone only" die) are shown in FIGS. 6A and 6B. (As referred to herein a "cone-only die" is a sizing die that has a cone portion 27 but not the bell portion 28. A cone-only die still has a cylindrical land portion 26 and may have an optional exit cylindrical leg portion 29, as shown in FIG. 6A or an optional upper cylindrical leg portion 32 as shown in FIG. 6B.) In the sizing cone-only die embodiment shown in FIGS. 6A and 6B, the bell portion 2W (formed by the convex walls) of the standard die such as the one shown in FIG. 2 has been removed completely (i.e., $L_0$=0 mm), and the tapered region 27 and the cylindrical land region 26 as well as optional cylindrical leg portion 29 and/or 32 are retained. The taper region 27 preferably has a small height or length $L_1$ such $L_1$≤2.2 mm, preferably 0.2 mm≤$L_1$≤2 mm. For example, in some exemplary embodiments the height $L_1$ of the taper region 27 is 0.25 mm 0.3 mm, 0.4 mm, 0.5 mm, 0.6 mm, 0.75 mm, 1 mm, 1.2 mm, 1.3 mm, 1.4 mm, 1.5 mm, 1.7 mm, 1.75 mm, 1.8 mm, or there-between. More preferably, in order to reduce the size of the Gyro G, the height $L_1$ is not greater than 2 mm, even more preferably $L_1$≤1.8 mm, and most preferably $L_1$≤1.5 mm. Preferably $L_1$≥0.25 mm, more preferably $L_1$≥0.5 mm, and even preferably $L_1$≥0.7 mm. According to some embodiments, 0.9 mm≤$L_1$≤1.2 mm. Applicants have discovered that the short height (small length) $L_1$ stabilizes the coating material gyre G, and reduces its size, which in turn results in better coatings and process stability. The length of the taper partly determines the amount of coating entrained by the fiber. t also, and for the same reason, affects the centering force: longer taper portions have higher centering forces but reject more coating. For example, a longer taper might (longer $L_1$) may be utilized for a single coating layer or to produce the firs coating layer in a wet-on-wet application, and a shorter taper region (smaller $L_1$) could be selected for the second sizing die in production of the second coating layer in order to minimize centering forces there.

The taper half-angle ⊖ of the taper portion of the sizing dies 25 is preferably not less than 2°, nor greater than 25°. Both smaller and larger taper angles do not develop enough centering forces to constrain the fiber 21 in the middle of the cone region 27. More preferably, 5°≤⊖≤25°, even more preferably 8°≤⊖≤25°

As shown in FIGS. 6A and 6B the cylindrical land portion 26 of the sizing die 25 is situated below the tapered portion 27. The land portion 26 contains a cylindrical bore with a diameter $d_2$ and a length $L_2$. The leg portion The sizing die may also further comprise a leg portion 29, 32 with a cylindrical inner wall (bore). For example, in some embodiments, the cylindrical inner wall of the leg portion has an inner diameter $d_3$ between 0.5 mm and 5 mm and a height $L_3$ between 2 mm and 6 mm.

As described above the cone-only sizing die(s) 25 may have an optional cylindrical exit leg portion 29 situated below the cylindrical land portion 26. The exit leg portion 29 of the die 25 is optional because the coated fiber 21 will be substantially smaller in diameter than the inner diameter, $d_3$ of the leg portion. However, the cylindrical exit leg portion 29 serves to keep the sizing die 25 aligned in a die holder (not shown) thereby preventing tilting of the sizing die 25 and the concomitant degradation in coating offset. The cylindrical exit leg 29 preferably has a height such that $L_3$<8.7 mm, more preferably $L_3$<6.7 mm, and most preferably $L_3$<4.8 mm. The cylindrical exit leg 29 preferably has a height such that $L_3$>0.8 mm, more preferably $L_3$>1.3 mm and most preferably $L_3$>1.8 mm. The inner diameter $d_3$ of the cylindrical leg portion 29 is greater than $d_2$, preferably greater than 2$d_2$. For example 0.4 mm<$d_3$<5 mm.

In the embodiment shown in FIG. 6A, the half-angle of the taper of the cone is 8°, and the height $L_1$ of the taper region 27 is 1.4 mm. The outer diameter of the sizing die 25 of this embodiment is 6.6 mm, and the overall height or total length of the sizing die of FIG. 6A is 4.6 mm.

FIG. 6B illustrates an embodiment of the sizing die that does not include the lower exit leg portion. Instead, the cone-one-only sizing die embodiment of FIG. 6B includes an upper leg portion 32, which is situated above the taper portion 27. The upper leg portion 32 serves to keep the sizing die aligned to the die holder and helps prevent the tilting of the sizing die when the sizing die is pressed into the holder. The inner diameter of upper leg portion 32 is preferably 1.2 mm-5 mm preferably the inner diameter of upper leg portion 32 is larger than $d_1$, preferably larger than Preferably the height of the upper leg portion 32 is less than 5 mm and greater than 1 mm, for example between 1.3 mm and 4.5 mm or between 1.5 mm and 3

Table 1, below, lists some exemplary geometrical parameters for some of the embodiments of the sizing dies described herein. More specifically, according to these embodiments the total length L of the sizing die 25, if the sizing die includes an optional exit leg portion 29, is preferably 3 mm to 9 mm (more preferably 4.5 mm to 7 mm), the preferred inner diameter $d_2$ (the diameter of the bore of the cylindrical portion 26) is 0.1 mm to 0.5 mm, and more preferably it is between 0.125 mm and 0.41 mm; the preferred length $L_2$ of the die cylindrical portion 27 is $0.5d_2 \leq L_2 \leq 2.5d_2$ and more preferably is $d_2 \leq L_2 \leq 2d_2$; the preferred height $L_1$ of the cone portion 27 is less than 2 mm, preferably 0.25 mm to 2 mm (and more preferably it is 0.9 mm to 1.2 mm), the preferred half cone angle is 4 to 25° (and more preferably it is between 8° and 25°)

TABLE 1

|  | Die length L(mm) when leg portion is present | Land region Diameter, mm $d_2$ | Die Cylindrical length $L_2$ (mm) | Cone height $L_1$(mm) | Cone ½ angle θ (deg) | Exit leg length $L_3$ (mm) |
|---|---|---|---|---|---|---|
| Preferably | 3 to 9 | 0.1 to 0.5 | 0.5 to 2.5x die diameter | 0.25 to 2 | 2 to 25 | $L_3 = L - (L_1 + L_2)$ |
| More Preferably | 5 to 7 | 0.125 to 0.41 | 1x to 2x die diameter | 0.9 to 1.2 | 8 to 25 | $L_3 = L - (L_1 + L_2)$ |

Thus, according to some embodiments a fiber coating apparatus comprises: a sizing die 25 with
 (a) fiber entrance opening 25A;
 (b) a first portion 27, the first portion forming a conical ferrule with tapered wall 27A, wherein the conical ferrule has a cross-section with inner walls angled at a half angle α and height $L_1$, where $2° \leq \alpha \leq 25°$, and $L_1$ is between 0.25 mm and 2 mm;
 (c) a cylindrical portion 26 having a substantially constant inner diameter $d_2$ and length $L_2$ situated below the first portion 27, such that 0.1 mm $\leq d_2 \leq$ 0.5 mm, and $0.5d_2 \leq L_2 \leq 2.5d_2$.
 Preferably, $1d_2 \leq L_2 \leq 2.2d_2$, more preferably $1.75d_2 \leq L_2 \leq 2.25d_2$, even more preferably $L_2 = 2d_2$. For example, in one embodiment $d_2 = 0.28$ mm and $L_2$ is 0.56 mm.

In some embodiments the sizing die 25 further includes an optional cylindrical exit leg portion 29 having an inner diameter $d_3$, where $d_3 > d_2$, and height (or length) $L_3$, where 1 mm $\leq L_3 \leq$ 6.7 mm. Preferably $d_3 > 2d_2$, for example $d_3 > 2.5d_2$.

According to some embodiments a fiber coating apparatus comprises:
 a sizing die 25 having
 (a) fiber entrance opening 25A;
 (b) a first portion 27, situated directly adjacent to the fiber entrance opening 25A, such that the sizing die 27 does not include a wall with a convex cross-section situated between the fiber entrance opening 25A and the first portion 27, the first portion forming a conical ferrule with tapered wall, wherein the conical ferrule has a cross-section with inner walls angled at a half angle α and height $L_1$, where $5° \leq \alpha \leq 25°$, and $L_1$ is between 0.5 mm and 1.8 mm;
 (c) a cylindrical portion 26 having a substantially constant inner diameter $d_2$ and length $L_2$ situated below the first portion 27, and 0.1 mm $\leq d_2 \leq$ 0.5 mm, and $0.5d_2 \leq L_2 \leq 2.5d_2$.

According to some embodiments said coating apparatus further includes a sizing die 25 that has a wall 28 with a convex cross-section having a height $L_0 < 0.5$ mm. However, it is more preferable that the coating apparatus does not include a wall with a convex cross-section situated between the fiber entrance opening and the conical ferrule with tapered wall 27A.

Examples 2 and 3 and 4

Figure 7A:
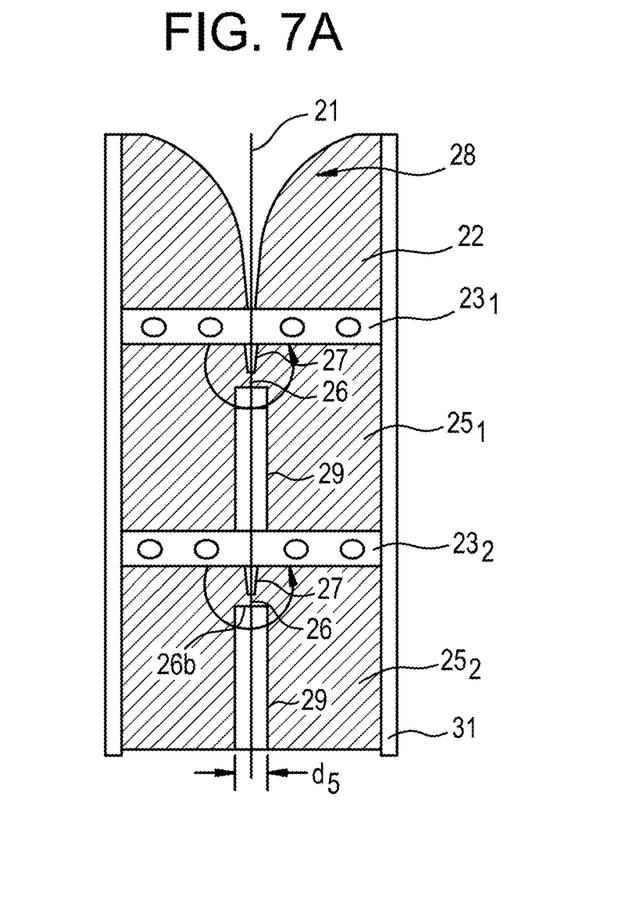
FIG. 7A is a schematic cross-sectional view typical of one embodiment of a wet-on-wet dual coating applicator.
Figure 7B:
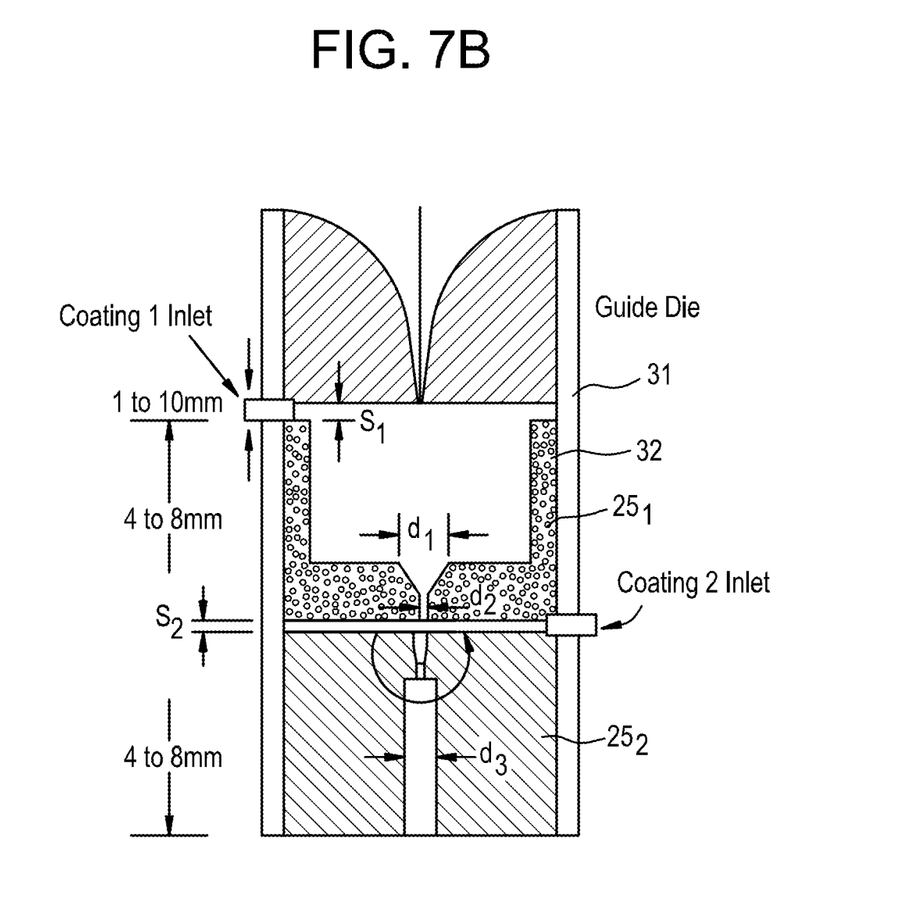
FIG. 7B is a schematic cross-sectional view typical of another embodiment of a wet-on-wet dual coating applicator.

Some embodiments of the wet-on-wet coating applicator that utilizes the cone-only sizing dies 25 is shown in FIGS. 7A and 7B: As mentioned above, the cone-only die is a die without the bell section 28 (i.e., when viewed in a cross-section it does not have the convex inner walls in its upper portion), but it may include other portions in addition to the tapered portion 27 and the land region 26). More specifically, as illustrated in FIGS. 7A and 7B the wet-on-wet coating applicator comprises a guide die 22, a first sleeve $23_1$ containing the first (primary) coating material, a first sizing die $25_1$ for applying the primary coating on fiber 21, a second sleeve $23_2$ containing the second (secondary) coating material and the second sizing die $25_2$ (bottom die) for applying the secondary coating over the primary coating. The separations S1, S2 between the dies are usually 1 to 10 mm, more preferably 0.25 mm to 5 mm. In the embodiment of FIG. 7A both sizing dies $25_1$ and $25_2$ are cone-only dies with a half-angle, θ=8°. In the FIG. 7A embodiment the dimensions of the first (top) sizing die $25_1$ are: $L_1$=1.4 mm, $d_1$=0.5 mm to 2 mm, $L_2$=0.23 mm, $d_2$=0.23 mm, $L_3$=2.9 mm, and $d_3$=2.5 mm. In the FIG. 7A embodiment the dimensions of the second (bottom) sizing die are: $L_1$=1.4 mm, $L_2$=0.34 mm, $L_3$=2.8 mm, $d_2$=0.34 mm and $d_3$=2.5 mm. The outer diameter, d, of both sizing dies $25_1$ and $25_2$ of FIG. 7A is 6.6 mm. In the FIG. 7A embodiment the separation S1 between the guide die 22 and the first sizing die $25_1$ is 1.5 mm. The separation S2 between the sizing dies $25_1$ and $25_2$ is also 1.5 mm.

In the FIG. 7B embodiment the dimensions of the first (top) sizing die $25_1$ are: θ=25°, $L_1$=1.4 mm, $d_1$ of 0.5 mm to 2 mm, $L_2$=0.43 mm, $d_2$=0.22 mm, $L_3$=5 mm and $d_3$=2.5 mm. The dimensions of the second (bottom) sizing die $25_2$ are: θ=8°, $L_1$=1.4 mm, $L_2$=0.69 mm, $d_2$=0.34 mm, $L_3$=2.49 mm, and $d_3$=2.5 mm. In FIG. 7B embodiment the separation S1 between the guide die and the first sizing die is 1.5 mm, and the separation S2 between the first and second sizing dies is 2 mm. The total height of each die $25_1$ and $25_2$ is preferably 4-8 mm.

Some of the advantages provided by the wet-on-wet coating applicator embodiments disclosed herein, such as these shown for example, in FIGS. 7A and 7B, relative the commercial applicator such as the one shown design in FIG. 5, are: (i) the improved (smaller) offset of both coatings, and (ii) the coating diameters produced by the applicators of FIGS. 7A and 7B have reduced (i.e., smaller) variability.

More specifically, because in these embodiments the pressures of the coating material at the tips tapered regions 27 are less variable, the variability in the amount of coating that is driven through the cylindrical portion 26 of each sizing die 25 is decreased. In addition, the guide die 22 is less likely to flood, again because the gyre G in the first sizing die ($25_1$) situated below the guide die 22 does not heat the coating material as much as gyres produced by the commercial coating dies that have a large upper bell regions (28 in FIG. 5) and/or relatively long taper regions.

According to some embodiments the WOW coating apparatus includes a guide die and at least two sizing dies, and at least one (and preferably both) of the sizing dies 25 comprise
  (a) fiber entrance opening 25A:
  (b) a first portion 27, situated below the fiber entrance opening 25A, the first portion forming a conical ferrule with tapered wall, wherein the conical ferrule has a cross-section with inner walls angled at a half angle $\alpha$ and height $L_1$, where $2°\leq\alpha\leq25°$ and $L_1$ is between 0.25 mm and 2 mm;
  (c) a cylindrical portion 26 situated adjacent to the first portion 27 having a substantially constant inner diameter $d_2$ and length $L_2$, such that 0.1 mm$\leq d_2\leq$0.5 mm and $0.5d_2\leq L_2\leq 2.5_2$.

The sizing dies $25_1$, $25_2$ of FIGS. 7A, 7B do not have a bell region 28 situated above the first portion 27 with walls that have a convex cross-section According to some embodiments the WOW coating apparatus includes a guide die and at least two sizing dies, and at least one (and preferably both) of the sizing dies 25 comprise
  (a) fiber entrance opening 25A:
  (b) a first portion 27, situated below the fiber entrance opening 25A, the first portion forming a conical ferrule with tapered wall, wherein the conical ferrule has a cross-section with inner walls angled at a half angle $\alpha$ and height $L_1$, where $2°\leq\alpha\leq25°$ and $L_1$ is between 0.25 mm and 2 mm;
  (c) a cylindrical portion 26 situated adjacent to the first portion 27 having a substantially constant inner diameter $d_2$ and length $L_2$, such that 0.1 mm$\leq d_2\leq$0.5 mm and $0.5d_2\leq L_2\leq 2.5_2$; and
  (d) a cylindrical leg portion 29, 32 having an inner diameter greater than $d_2$, the cylindrical leg portion being situated either above the first portion 27 or below (downstream) of the cylindrical portion 26.

Figure 7C:
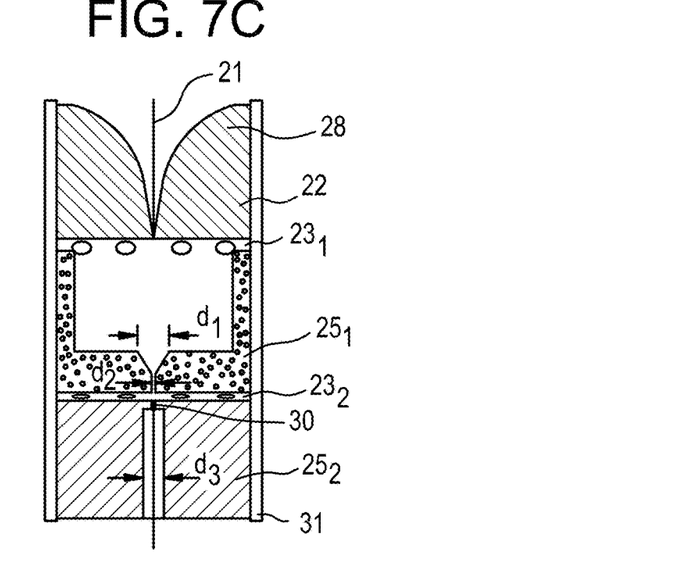
FIG. 7C is a schematic cross-sectional view typical of another embodiment of a wet-on-wet dual coating applicator.

A wet-on-wet coating applicator similar to that shown in FIG. 7C can produce fiber with excellent offset by utilizing a second sizing die $25_2$ that only has a cylindrical land portion 26 with an inner diameter $d_3$ (bore diameter) and orifice 26B and no conical walls. (Such sizing die is also referred herein as an orifice only die). That is, in the embodiment of FIG. 7C, the second or lower sizing die ($25_2$) has a cylindrical region 26 and does not have taper and bell regions 27 and 28.

Thus, according to some embodiments (see, for example, FIG. 7C) the coating apparatus comprises:
  (I) a guide die;
  (II) at least two sizing dies situated downstream of the guide die, such that
    (i) at least one of the sizing dies comprises: (a) fiber entrance opening $25A_1$; (b) a first portion 27, situated directly adjacent to the fiber entrance opening so that the sizing dies do not include a wall with a convex cross-section situated between said fiber entrance opening and the first portion 27, the first portion 27 forming a conical ferrule with tapered wall 27A, wherein the conical ferrule has a cross-section with inner walls angled at a half angle $\alpha$ and height $L_1$, where $2°\leq\alpha\leq25°$, and $L_1$ is between 0.25 mm and 2 mm; (c) a cylindrical portion $26_1$ having a substantially constant inner diameter $d_2$ and length $L_2$, such that 0.1 mm$\leq d_2\leq$0.5 mm, and 0.5 $d_2\leq L_2\leq 2.5d_2$ and an exit aperture $26B_1$; and
    (ii) the other of the at least two sizing dies does not include either a wall with a convex cross-section nor a conical ferrule with tapered wall and comprises (a) fiber entrance opening $25A_2$, a cylindrical portion $26_2$ directly adjacent to the fiber entrance opening $25A_2$, and an exit aperture $26B_2$.

The embodiments of FIGS. 7A and 7B are more preferable to that shown in FIG. 7C for the following reasons. During start up, the material flow for the second coating will generally be turned on first, and, without a taper region 27 in the second sizing die $25_2$, the resistance to the flow of the second coating material in the gap created between the orifice (exit opening) $26B_2$ of the cylindrical land region $26_2$ and the fiber 21 is very small. This lack of resistance can lead to leaks and lumps (i.e., defects in the coating and are often caused by pressure fluctuations in the coating delivery) in the secondary coating material. Even when the orifice-only style secondary sizing die does not leak, the resulting diameter of the second coating is large and the diameter uniformity is difficult to control. In addition, when pressure is the only means of regulating the secondary coated fiber diameter, as with orifice $26B_2$, there is also greater coating diameter variability during ramp or even during steady operation.

Compared to an embodiment of the coating applicator in which an orfice-only sizing (sizing die having only a cylindrical portion) is used as the second sizing die (as shown in FIG. 7C), the embodiments of the wet-on wet coating applicators of FIGS. 7A and 7B are advantaged because the small height (0.2 mm$<L_1\leq$2 mm) of the taper portion 27 of the second (lower) sizing die $25_2$ allows the die to sustain higher applied pressure. That eliminates the propensity of the orifice 26B of the second sizing $25_2$ to leak at startup, and greatly improves coating diameter control during both ramp up and normal operations. The taper region in the second sizing die $25_2$ permits the application of 5-20 psi during startup, which is be sufficient to create a coating meniscus.

In the embodiments of the coating applicators of FIGS. 7A, 7B and 7C, the holder 31 for the three dies is a single tube manufactured such that the dies are all concentric. The tube and holder design should also accommodate different gaps (distances) between the sizing dies $25_1$ and $25_2$ and between the first sizing die $25_1$ and the guide die 22, as these distances S1, S2 can affect the amount of entrained coating and thus the coated diameters. (Distances S1, S2 are distances between the edges of the dies)

Figure 8:
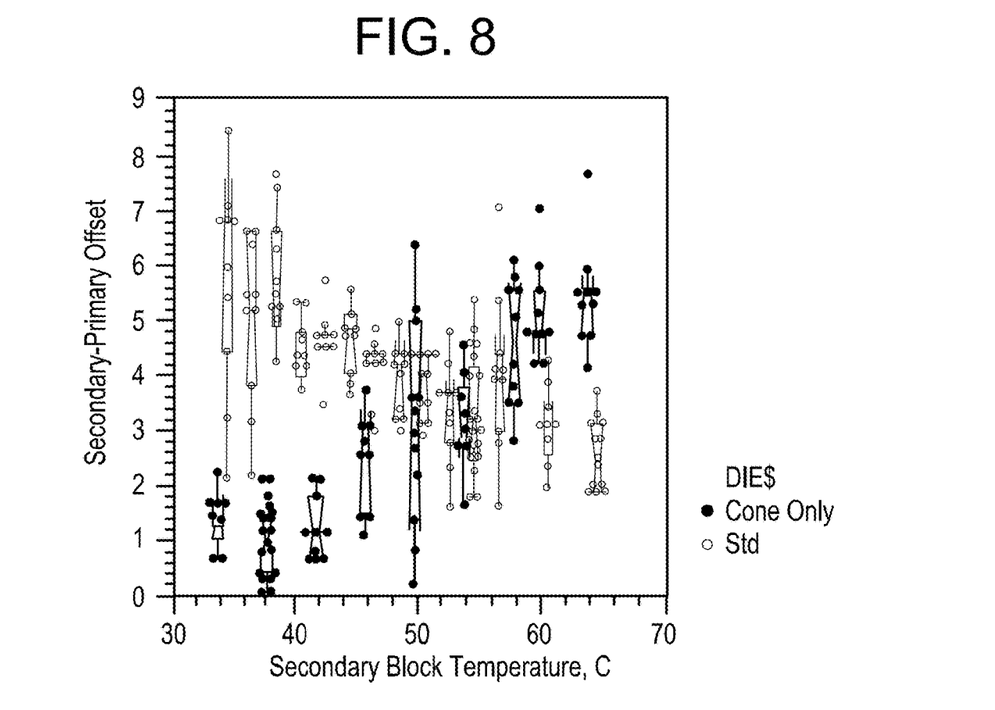
FIG. 8 illustrates the offset of the center of the secondary coating from the center of the primary coating of fibers with secondary coatings produced with two different sizing dies.

The improved geometry of sizing die embodiments described herein (see, for example, sizing die embodiments of FIGS. 6A, 6B, 7A, and 7B) results in one or more of the following advantages: reduction in the size of the coating gyre G (which is a consequence of reducing the amount of coating rejected by the reduced bell/taper size); and/or rejection of the enough coating material so as to maintain a substantial centering force in the sizing die (i.e., force that is sufficient to center the fiber in the die), especially at faster speeds and higher coating viscosities. For example, FIG. 8 shows the offset of the center of the secondary coating from the center of the primary coating of fibers with secondary coatings produced with the sizing dies of in FIGS. 3 and 6A

(labeled "Std" and "Cone-Only" respectively). As shown in FIG. 8, at low secondary coating material delivery temperatures (i.e., below 45° C.), the offset of the secondary coating produced by the cone-only sizing dies 25 is more than a factor of five lower than that produced by using the standard die of FIG. 5. Moreover, as the coating material temperature increases the secondary coating offset increases for the coatings produced by cone-only sizing die embodiments, which is in agreement with the predictions of axisymmetric computer fluid-flow models—the higher coating viscosity at lower temperature increases the centering forces, which reduces the coating offset. The typical commercial sizing die of FIG. 3 (used as a comparative example) shows the opposite behavior, i.e., the coating offset decreases as the secondary's coating material temperature increases. This is again the consequence of the gyre in the coating die bell portion present in the standard die. The temperature gradient between the fiber and the central region of the gyre is greatest when the coating temperature is lower because the shear heating in the gyre is greatest when the coating is more viscous. The gradient in the coating viscosity, which depends exponentially on temperature, is thus also much greater when the standard die is used at lower temperatures (<45° C.). As noted previously there is azimuthal variation in the flow and temperature within the gyre—the gyre tends to precess. As the heated, low-viscosity coating material in the gyre G is dragged by the fiber motion into the cone area of the taper region 27, the azimuthal variation in temperature, and hence viscosity, creates a net force that acts to drive the fiber 21 off the center of the die axis. The net force is thus responsible for an applied coating that is not concentric with the fiber. Moreover, our observations of this gyre precession reveal that the azimuthal variation is not steady, rather it varies with time, and the temporal character of the precession results in a chaotic or random coating concentricity.

Figure 9:
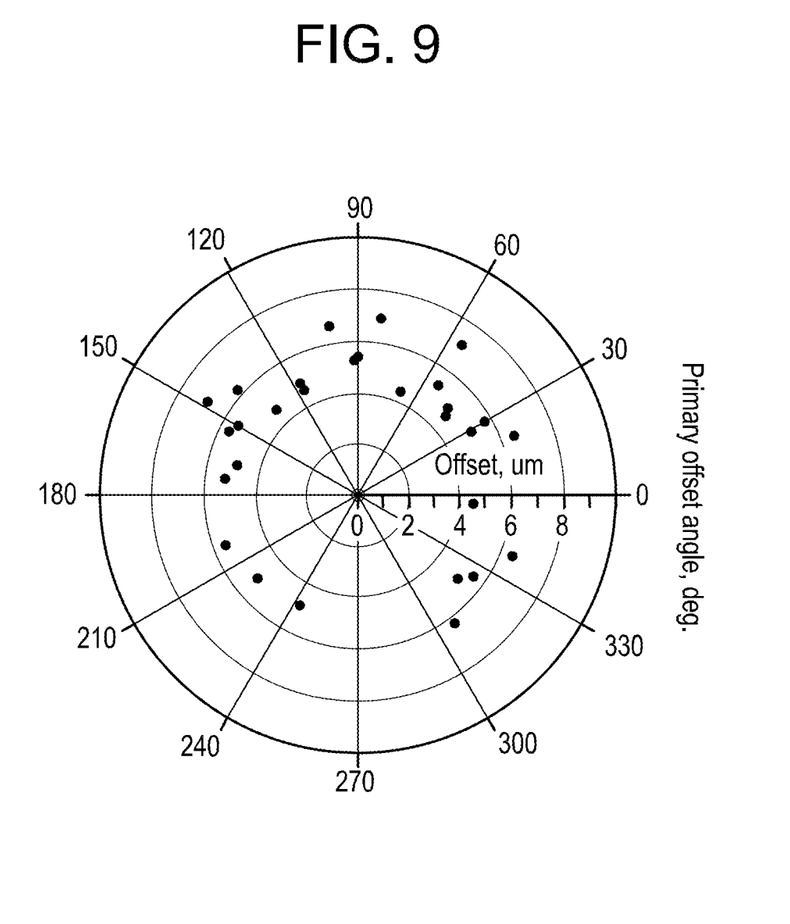
FIG. 9 is illustrates the offset magnitude (radial component) and azimuthal orientation of an offset of single-layer coating that was applied using a standard die.

FIG. 9 illustrates the offset magnitude (radial component) and azimuthal orientation of offset of single-layer coating that was applied using a standard sizing die, similar to that shown in FIGS. 2 and 3. (That is, we used radial coordinates to define the concentricity shown in FIG. 9. The magnitude is the distance from the origin to the point, and the orientation is the angle from straight up). As the azimuthal variations in the gyre G occur randomly, the fiber can move from one side of the die to the other in chaotic or random fashion. This movement of the fiber is shown in FIG. 9. The randomness is independent of pressure, as the gyre is driven by the fiber motion, and it occurs at every temperature. However, it's more pronounced at lower temperature, because the difference in temperature between the inside of the gyre and the outside is greatest at lower temperatures. FIG. 9 illustrates that the magnitude of the offset is never zero, meaning that the fiber is never perfectly situated in the center of the sizing die. (The term coating offset, as used herein, is the physical distance between the center of the fiber (its axis) and the center of the coating layer. Ideally, the centers of the fiber and the coatings are the same and the coating is perfectly concentric with the glass)

The strength of the gyre G is also proportional to the tractor rate (i.e., fiber draw rate), therefore it becomes increasingly important to limit the gyre size at the fastest speeds (i.e., at draw rates >25 m/s). This can be done by minimizing the height of the convex walls forming the bell portion 28 (i.e., minimizing the size of the convex walls) so that the height $L_0$ is <1 mm and preferably $L_0 \leq 0.5$ mm, and more preferably by eliminating the bell portion 28 entirely (e.g., using cone-only embodiments) as shown in FIGS. 6A, 6B and 7A-7C.

Another important consequence of reducing the gyre size is that the upper coating material meniscus, the point at which coating material first contacts the fiber, is stabilized. We have observed that dies flood (fiber dewets) at pressures as low as 60 psi, and that this pressure is lower at faster speeds, where a force balance between pressure and drag forces suggests that the sizing die should be stable up to 1000 psi. With the use of a standard commercial sizing die (i.e., a die with a relatively large bell portion), hot coating material from the gyre G can penetrate the space between the fiber and the guide die and substantially reduce the resistance of the guide die to flooding. With the cone-only sizing die embodiment, (see for example FIGS. 6A, 6B, 7A, and 7B), the temperature increase and the resulting viscosity decrease are smaller, which greatly reduces the likelihood of flooding in typical production conditions.

Applicants discovered that the height $L_1$ of the tapered region 27 is an important parameter that helps reduce the size of the gyro G, and its velocity. Preferably, as discussed above, sizing dies 25 have cone height $L_1$ where $L_1 < 2$ mm. Preferably 1.3 mm $\leq L_1 \leq 1.5$ mm. Preferably and $\frac{1}{2} d_2 \leq L_2 \leq 2.5 d_2$, where 0.5 mm $\leq d_2 \leq 1.1$ mm. For example. $d_2 \leq L_2 \leq 2 d_2$. For example, FIG. 10 illustrates single-layer coating offsets, produced by the embodiments similar to that of FIG. 6, with sizing dies 25 having cone height of $L_1$ where $L_1$ is $\frac{1}{2}$ $d_2$ and 2 $d_2$, and in this study $d_2 = 0.56$ mm.

Figure 10:
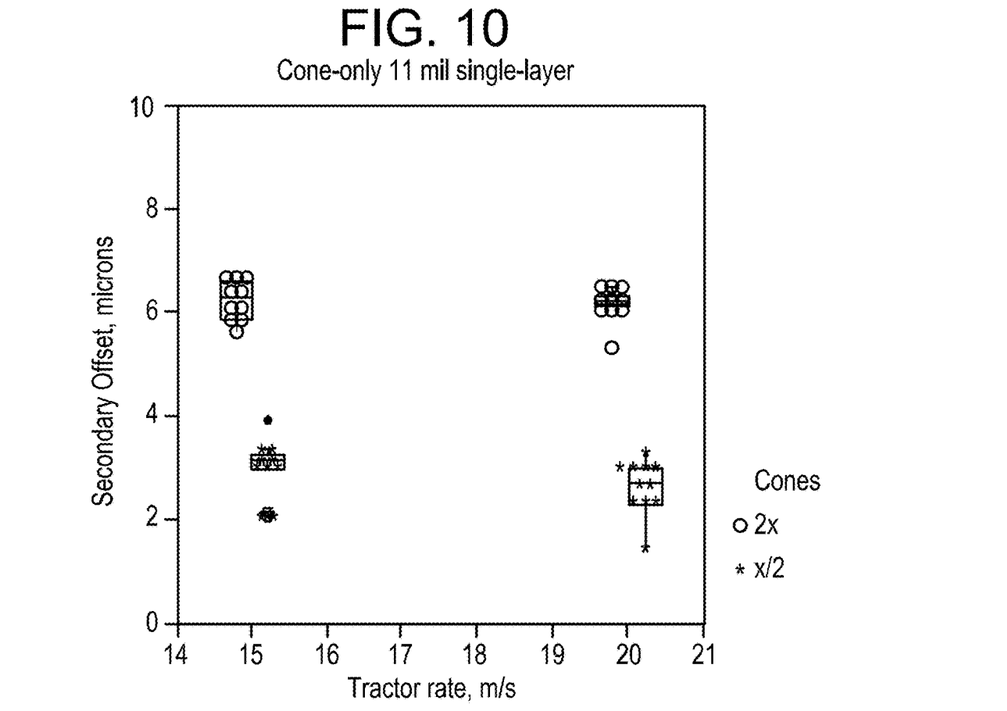
FIG. 10 illustrates single-layer coating offsets produced by the embodiments similar to that of FIG. 6A.

As shown in FIG. 10, the coating offset is much lower when the taper (i.e., cone) height $L_1$ is half the diameter $d_2$ compared to when the taper height $L_1$ is twice the die diameter $d_2$. As discussed above, one of the important considerations is the amount of coating material rejected by the sizing die. It is important to reduce the amount of coating material rejected by the sizing die(s) 25. The longer tapered region 27 increases the amount of coating entrained by the fiber and also the amount rejected. Accordingly it is preferable that the height $L_1$ of the tapered region 27 be 0.5 mm to 2 mm and more preferably 0.9 mm to 1.2 mm. FIG. 10 also suggests that a gyre G located in the taper portion 27 of the die 25 has a strong adverse effect on coating offset and this effect needs to be reduced. Applicants discovered that when the height $L_2$ of the tapered region 27 is equal to or less than 2 mm the adverse effect of the gyre G is significantly minimized.

Figure 11:
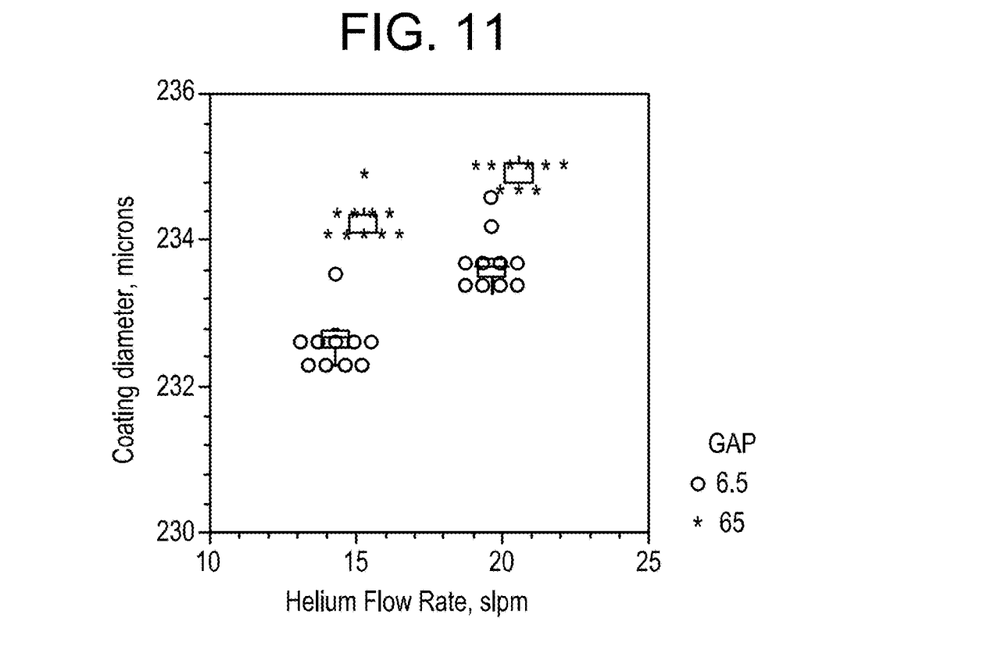
FIG. 11—illustrates single-layer coating diameter vs. temperature of the fiber as it enters the coating applicator, produced in coating applicators with two different distances (gaps) between the guide die and the sizing die.

The coated fiber diameter is also a function of the gap (separation) between the guide die 22 and sizing dies 25, as shown in FIG. 11. The boundary layer of coating entrained with the fiber is thicker for the longer distance S1, S2, increasing the pressure at the tip of the taper portion 27 of the sizing die 25 and increasing the thickness of the coating layer on the fiber.

Figure 12:
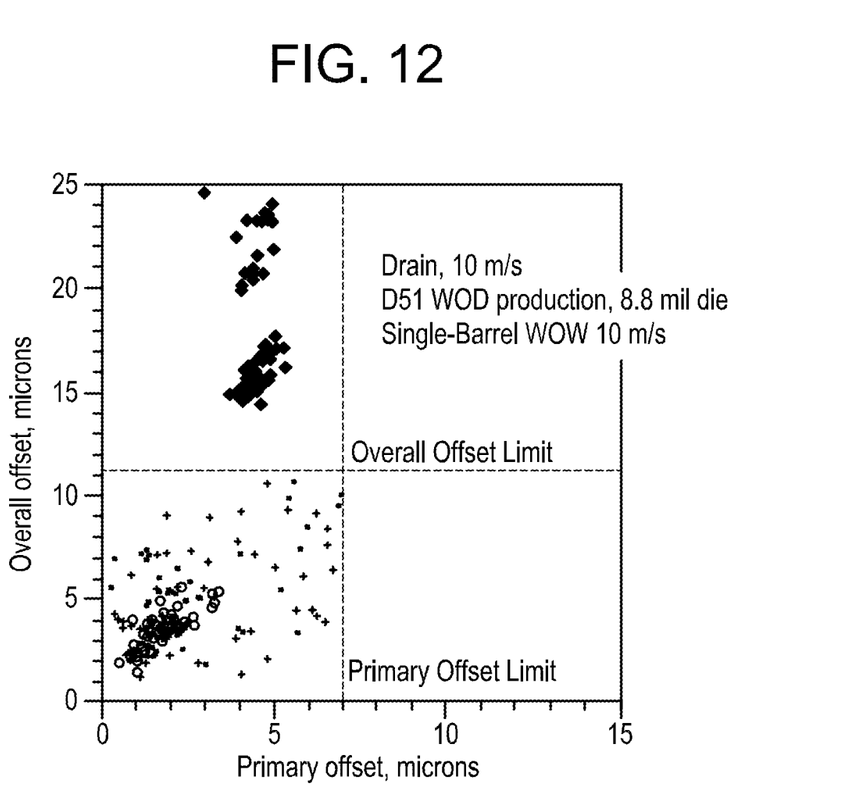
FIG. 12—illustrates the overall coating offset as a function of the primary coating offset for wet-on-dry (WOD) applications of the two coatings as well as two different types of wet-on-wet (WOW) coating application processes.

The geometry of coatings applied wet-on-wet is also much improved when the improved sizing dies are utilized. FIG. 12 illustrates the overall coating offset as a function of the primary coating offset for wet-on-dry (WOD) applications of the two coatings as well as two different types of wet-on-wet (WOW) coating application processes. Overall offset is the physical distance, typically measured in μm, between the center of the second coating and the center of the fiber; primary offset is the physical distance, typically measured in μm, between the center of the primary coating and the center of the fiber. More specifically FIG. 12 shows the primary coating's offset and the overall offset (secondary coating offset relative to the fiber center) for the coatings applied with: 1) the commercial coating applicator of FIG. 5 (green points), to that applied with 2) an applicator that utilizes an orifice only sizing die (see FIG. 7C, blue); and 3) conventional wet-on-dry applicator (red) of FIG. 3.

As shown in FIG. 12, a wet-on-wet applicator that utilizes a second sizing die that is "orifice only" (as shown in FIG. 7C, for example) can greatly improve coating layer offset compared to the commercial applicator of FIG. 3, but as noted above, this is not the most preferred solution because of startup and control issues. Equivalent or better coating offset can be achieved with a wet-on-wet applicator that utilizes a second sizing with the cone-only design (for example those of FIGS. 7A and 7B), without those disadvantages.

Thus, according to some embodiments, a method for coating an optical fiber comprises:

(I) coating the optical fiber with a coating material by moving the optical fiber through at least one sizing die, the at least one sizing die including:

(a) fiber entrance opening; (b) a first portion, situated below the fiber entrance opening, the first portion forming a conical ferrule with tapered wall, wherein the conical ferrule has a cross-section with inner walls angled at a half angle $\alpha$ and height $L_1$, where $2° \leq \alpha_1 \leq 25°$ and $L_1$ is between 0.25 mm and 2 mm; (c) a cylindrical land portion situated adjacent to the first portion having a substantially constant inner diameter $d_2$ and length $L_2$, such that 0.1 mm $\leq d_2 \leq 0.5$ mm and $0.5 d_2 \leq L_2 \leq 2.5_2$. The sizing die may also include a cylindrical leg portion having an inner diameter greater than $d_2$, the cylindrical leg portion being situated either above the first portion or below the cylindrical land portion, and According to some embodiments, a method for coating an optical fiber comprises:

(I) coating the optical fiber with a primary coating material by moving the optical fiber through the first sizing die of the coating apparatus, the first sizing die including:

(a) fiber entrance opening; (b) a first portion, situated below the fiber entrance opening, the first portion forming a conical ferrule with tapered wall, wherein the conical ferrule has a cross-section with inner walls angled at a half angle $\alpha$ and height $L_1$, where $2° \leq \alpha_1 \leq 25°$ and $L_1$ is between 0.25 mm and 2 mm; (c) a cylindrical land portion situated adjacent to the first portion having a substantially constant inner diameter $d_2$ and length $L_2$, such that 0.1 mm $\leq d_2 \leq 0.5$ mm and $0.5 d_2 \leq L_2 \leq 2.5_2$; and (d) a cylindrical leg portion having an inner diameter greater than $d_2$, the cylindrical leg portion being situated either above the first portion or below the cylindrical land portion, and (II) subsequently applying a secondary coating by moving the optical fiber with the primary coating thereon through the second sizing die of the coating apparatus, the second sizing die including: (a) fiber entrance opening; (b) a first portion, situated below the fiber entrance opening, the first portion forming a conical ferrule with tapered wall, wherein the conical ferrule has a cross-section with inner walls angled at a half angle $\alpha$ and height $L_1$, where $2° \leq \alpha_2 \leq 25°$ and $L_1$ is between 0.25 mm and 2 mm; (c) a cylindrical land portion situated adjacent to the first portion having a substantially constant inner diameter $d_2$ and length $L_2$, such that 0.1 mm $\leq d_2 \leq 0.5$ mm and $0.5 d_2 \leq L_2 \leq 2.5_2$; and (d) a cylindrical leg portion having an inner diameter greater than $d_2$, the cylindrical leg portion being situated either above the first portion or below the cylindrical land portion.

According to some embodiments $\alpha_1 > \alpha_1$. Preferably $10° < \alpha_1 < 25°$, and $2° < \alpha_2 < 15°$. For example, the half angle $\alpha$ of the first (top) sizing die may be $15° < \alpha_1 < 25°$ and $5° < \alpha_2 < 10°$. Also, it is preferable that in the top (first) sizing die $25_1$ the cylindrical leg portion is situated at least above the first (taper portion) portion 27, and in the bottom (second) sizing die $25_2$ the cylindrical leg portion is situated or below the cylindrical land portion 26.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber coating apparatus comprising:
a sizing die comprising
(a) fiber entrance opening;
(b) a first portion, situated directly adjacent to said fiber entrance, the first portion forming a conical ferrule with tapered wall, wherein the conical ferrule has a cross-section with inner walls angled at a half angle $\alpha$ and cone height $L_1$, where
$2° \leq \alpha \leq 25°$, $L_1$ is between 0.25 mm and 2 mm; and
(c) a cylindrical portion having a substantially constant inner diameter $d_2$ and length $L_2$, such that
0.1 mm $\leq d_2 \leq 0.5$ mm, and $0.5 d_2 \leq L_2 \leq 2.5 d_2$ and $L_1 \leq 0.75 d_2$.

2. The fiber coating apparatus comprising according to claim 1, wherein said coating apparatus does not include a wall with a convex cross-section situated between said fiber entrance opening and said conical ferrule with tapered wall.

3. The fiber coating apparatus comprising according to claim 1, wherein said coating apparatus includes a wall with a convex cross-section situated between said fiber entrance opening and said conical ferrule with tapered wall, said wall with the convex cross-section having a height <1 mm.

4. The fiber coating apparatus according to claim 1, wherein 0.5 mm $\leq d_2 \leq 2$ mm.

5. The fiber coating apparatus according to claim 1, and further comprising a leg portion with a cylindrical inner wall, said leg portion situated adjacent to and down stream of said cylindrical portion, said cylindrical inner wall of said leg portion having an inner diameter $d_3$ between 0.5 mm and 5 mm and a length $L_3$ between 2 and 6 mm.

6. The fiber coating apparatus according to claim 4, wherein 0.5 mm $\leq L_1 \leq 1.75$ mm.

7. The fiber coating apparatus according to claim 6, wherein 0.5 mm $\leq L_1 \leq 1.5$ mm.

8. The fiber coating apparatus according to claim 1, wherein $4° \leq \alpha \leq 25°$.

9. The fiber coating apparatus according to claim 1, wherein $L_1 \leq 0.5 d_2$.

10. The fiber coating apparatus according to claim 1, further comprising a leg portion with a cylindrical inner wall, said cylindrical inner wall of said leg portion having an inner diameter $d_3$ between 0.5 mm and 5 mm and a length $L_3$ between 2 and 6 mm.

11. A fiber coating apparatus comprising:
(I) a guide die;
(II) a first sizing die situated adjacent to the guide die, the first sizing die comprising
 (a) fiber entrance opening;
 (b) a first portion, situated below the fiber entrance opening, the first portion forming a conical ferrule with tapered wall, wherein the conical ferrule has a cross-section with inner walls angled at a half angle α and height $L_1$, where $2° \leq \alpha_1 \leq 25°$ and $L_1$ is between 0.25 mm and 2 mm;
 (c) a cylindrical land portion situated adjacent to the first portion having a substantially constant inner diameter $d_2$ and length $L_2$, such that 0.1 mm $\leq d_2 \leq$ 0.5 mm and $0.5d_2 \leq L_2 \leq 2.5d_2$ and $L_1 \leq 0.75\ d_2$; and
 (d) a cylindrical leg portion having an inner diameter greater than $d_2$, the cylindrical leg portion being situated either above the first portion or below the cylindrical land portion; and
(III) a second sizing die situated adjacent to said first sizing die.

12. The fiber coating apparatus comprising according to claim 11 wherein said cylindrical leg portion of said first sizing die is positioned above said fiber entrance opening and adjacent to said first portion of said first sizing die, and $8° \leq \alpha_1 \leq 25°$.

13. The fiber coating apparatus comprising according to claim 12 wherein:
the second sizing die comprises: (a) fiber entrance opening; (b) a first portion, situated below the fiber entrance opening, the first portion forming a conical ferrule with tapered wall, wherein the conical ferrule has a cross-section with inner walls angled at a half angle α2 and height $L_1$, where $2° \leq \alpha_{a2} \leq 25°$ and $L_1$ is between 0.25 mm and 2 mm; (c) a cylindrical land portion situated adjacent to the first portion having substantially constant inner diameter $d_2$ and length $L_2$, such that 0.1 mm $\leq d_2 \leq$ 0.5 mm and $0.5d_2 \leq L_2 \leq 2.5d_2$; and (d) a cylindrical leg portion having an inner diameter greater than $d_2$, the cylindrical leg portion being situated below the cylindrical land portion.

14. A method for coating an optical fiber, comprising:
(I) coating the optical fiber with a primary coating material by moving the optical fiber through the first sizing die of the coating apparatus of claim 11, and
(II) applying a secondary coating by moving the optical fiber with the primary coating thereon through the second sizing die of the coating apparatus of claim 11.

15. A fiber coating apparatus comprising:
(I) a guide die;
(II) a first sizing die situated adjacent to the guide die, the first sizing-die comprising:
 (a) a fiber entrance opening;
 (b) a first portion, situated below the fiber entrance opening, the first portion forming a conical ferrule with tapered wall, wherein the conical ferrule has a cross-section with inner walls angled at a half angle $\alpha_1$ and height $L_1$, where $5° \leq \alpha_1 < 25°$ and $L_1$ is between 0.25 mm and 2 mm;
 (c) a cylindrical land portion situated adjacent to the first portion having a substantially constant inner diameter $d_2$ and length $L_2$, such that 0.1 mm $\leq d_2 \leq$ 0.5 mm and $0.5d_2 \leq L_2 \leq 2.5d_2$ and $L_1 \leq 0.75\ d_2$; and
 (d) a cylindrical leg portion having an inner diameter greater than $d_2$, the cylindrical leg portion being situated either above the first portion or below the cylindrical land portion; and
(III) a second sizing die situated adjacent to said first sizing die.

16. The fiber coating apparatus comprising according to claim 15 wherein said cylindrical leg portion of said first sizing die is positioned above said fiber entrance opening and adjacent to said first portion of said first sizing die, and $8° \leq \alpha_1 \leq 25°$.

* * * * *

UNITED STATES PATENT AND TRADEMARK OFFICE
CERTIFICATE OF CORRECTION

PATENT NO. : 10,036,108 B2
APPLICATION NO. : 14/521900
DATED : July 31, 2018
INVENTOR(S) : Robert Clark Moore et al.

It is certified that error appears in the above-identified patent and that said Letters Patent is hereby corrected as shown below:

In the Claims

Column 17, Line 37, Claim 13, delete "$2°\leq\alpha_{\alpha 2}\leq 25°$" and insert -- $2°\leq\alpha_2\leq 25°$ --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*